(12) United States Patent
Chen et al.

(10) Patent No.: US 6,825,415 B1
(45) Date of Patent: Nov. 30, 2004

(54) ELEVATION ADJUSTMENT STRUCTURE OF A PORTABLE INFORMATION DISPLAY DEVICE

(75) Inventors: Ching-Jou Chen, Taipei (TW); Tzu-Wei Lai, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 10/841,634

(22) Filed: May 10, 2004

(30) Foreign Application Priority Data

Feb. 25, 2004 (TW) ........................................ 93104751 A

(51) Int. Cl.⁷ ............................................... H02G 13/00
(52) U.S. Cl. ...................... 174/63; 174/50; 174/50.54; 174/52.1; 248/188; 248/188.2; 248/188.6; 248/346.01; 248/349.1; 248/65; 248/917; 361/687; 361/688; 361/689; 361/700; 361/714
(58) Field of Search .................... 174/63, 50, 50.54, 174/52.1; 248/188, 188.2, 188.6, 346.01, 349.1, 65, 917; 361/687, 688, 689, 700, 714

(56) References Cited

U.S. PATENT DOCUMENTS

| | | | | |
|---|---|---|---|---|
| 5,953,052 A | * | 9/1999 | McNelley et al. | 348/14.16 |
| 6,098,952 A | * | 8/2000 | Tonn | 248/688 |
| 6,353,529 B1 | * | 3/2002 | Cies | 361/681 |
| 6,474,614 B2 | * | 11/2002 | MacEachern | 248/349.1 |

* cited by examiner

*Primary Examiner*—Dean A. Reichard
*Assistant Examiner*—Anton Harris
(74) *Attorney, Agent, or Firm*—Bacon & Thomas PLLC

(57) ABSTRACT

An elevation adjustment structure of a portable information display device is disclosed to include a portable information display device, a battery box detachably attached to the back wall of the portable information display device, and a swinging arm pivoted to the battery box and rotatable upwards from the battery box for supporting the portable information display device on the battery box in a tilted position, the swinging arm having butts protruded from the top side thereof for engaging into respective recessed bearing holes in the back wall of the portable information display device to support the portable information display device in the tilted position.

5 Claims, 4 Drawing Sheets

ELEVATION ADJUSTMENT STRUCTURE OF A PORTABLE INFORMATION DISPLAY DEVICE

BACKGROUND OF THE INVENTION

1. Field of the Invention

The present invention relates to an elevation adjustment structure and more particularly, to an elevation adjustment structure suitable for use in a portable information display device, for example DVD player or PDA.

2. Description of Related Art

A portable information display device generally comprises a display panel for displaying internal information of the portable information display device. For example, the display panel of a DVD (Digital Video Disc) player is adapted to display the storage audio/video information of a disk, for example, a motion picture.

However, when a portable information display device is placed on a table, the elevation of the display panel may be lower than the height of the eyes of, the user sitting in front of the table. When viewing the information displayed on the display screen of the display panel, the user may have to incline the head. If the user keeps the head inclined when viewing the display screen of the display panel for a certain length of time, the user will soon feel uncomfortable. For example, when watching a motion picture through a DVD player, it may take more than 2 hours, and the user's body will soon become uncomfortable at the posture in which the head is kept inclined.

SUMMARY OF THE INVENTION

The present invention has been accomplished under the circumstances in view. It is therefore the main object of the present invention to provide an elevation adjustment structure of a portable information display device, which enables the portable information display device to be conveniently adjusted to the proper height for viewing by the user comfortably.

To achieve this and other objects of the present invention, the elevation adjustment structure of a portable information display device, comprises a portable information display device, and a battery box. The portable information display device comprises a base member. The base member comprises a back wall, a front edge, and a rear edge. The back wall comprises at least one recessed mounting hole disposed adjacent to the rear edge of the base member, two recessed locating holes bilaterally disposed adjacent to the front edge and extended to the front edge of the base member, a socket type electric connector disposed adjacent to the front edge of the base member, and at least one recessed bearing hole disposed on the middle position between the front edge and rear edge of the base member. The battery box comprises a top wall, a front edge, and a swinging arm. The top wall comprises two upright locating rods bilaterally disposed adjacent to the front edge of the battery box and adapted to engage into the two recessed locating holes of the base member of the portable information display device respectively, and a plug type electric connector disposed adjacent to the front edge of the battery box and corresponding connectable to the socket type electric connector of the portable information display device. The swinging arm comprises a bottom side pivoted to the battery box, a top side, and at least one top butt protruded from the top side.

Normally, the battery box is provided beneath the portable information display device with the top wall of the battery box attached to the back wall of the base member in a collecting position to force the at least one top butt of the swinging arm into the at least one recessed mounting hole in the back wall of the base member respectively, keeping the plug type electric connector electrically connected to the socket type electric connector and the upright locating rods respectively engaged into the recessed locating holes of the portable information display device. Further, the swinging arm is rotatable upwards relative to the top wall of the battery box for supporting the portable information display device on the battery box in a tilted position. In this position, the at least one top butt of the swinging arm is respectively engaged into the at least one recessed bearing hole in the back wall of the base member of the portable information display device, the two recessed locating holes of the base member of the portable information display device are respectively coupled to the two upright locating rods, and the plug type electric connector is electrically connected to the socket type electric connector.

DETAILED DESCRIPTION OF THE PREFERRED EMBODIMENT

Figure 1:
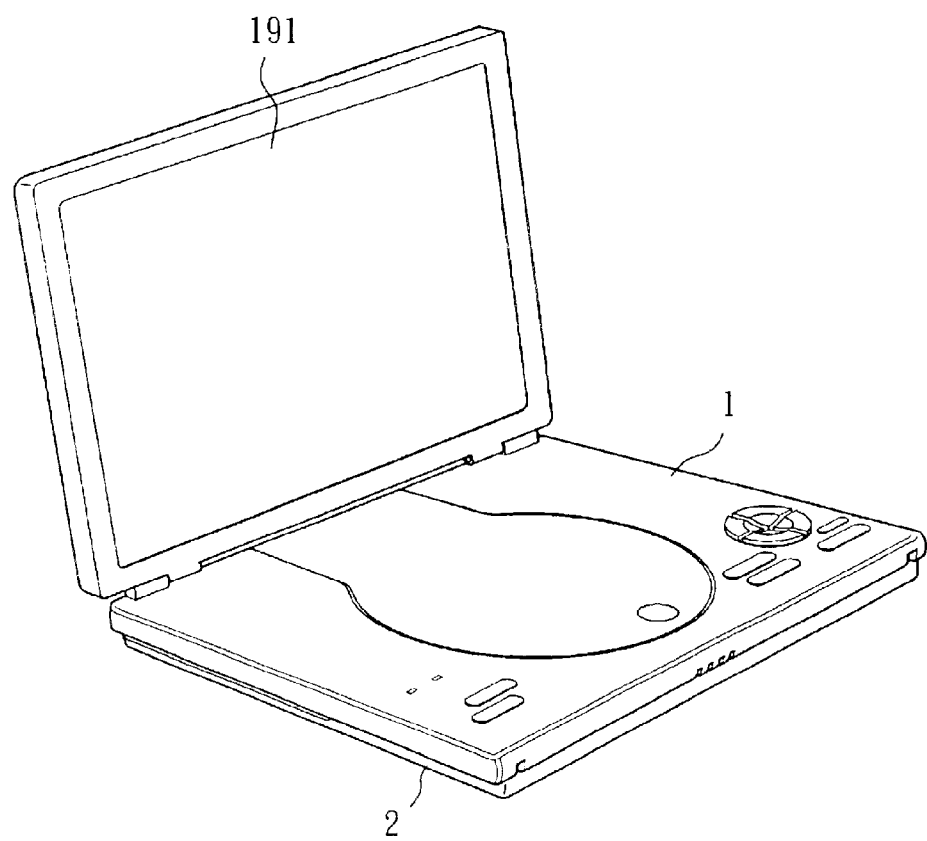
FIG. 1 is a perspective assembly view of the preferred embodiment of the present invention.

In FIG. 1, a battery box 2 is provided beneath a portable information display device 1. According to the present preferred embodiment, the portable information display device 1 is a DVD (Digital Video Disc) player.

Figure 2:
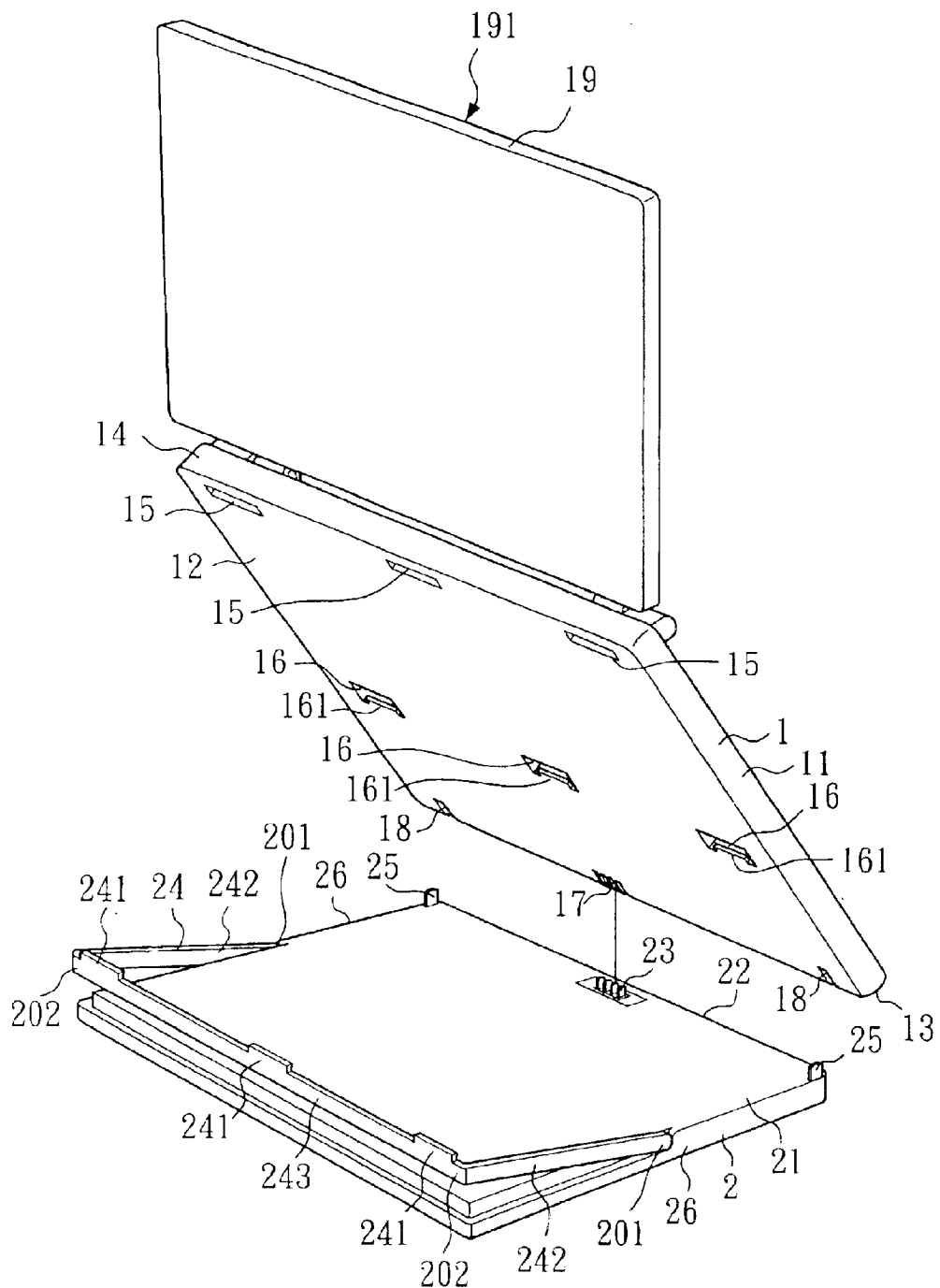
FIG. 2 is an exploded view of the preferred embodiment of the present invention.

Referring to FIG. 2, the portable information display device 1 comprises a base member 11 and a display panel 19. The base member 11 has a back wall 12, a front edge 13, and a rear edge 14. The back wall 12 comprises three recessed mounting holes 15 arranged in a line adjacent to the rear edge 14, two recessed locating holes 18 bilaterally disposed adjacent to the front edge 13 and extended to the front edge 13, a socket type electric connector 17 disposed adjacent to the front edge 13, three recessed bearing holes 16 arranged in a line on the middle position between the front edge 13 and the rear edge 14, and three retaining rods 161 respectively suspended in the recessed bearing holes 16. The display panel 19 is hinged to the base member 11 near the rear edge 14, having a display screen 191. The display panel 19 can be turned relative to the base member 11 to open/close the display screen 191. When opened the display panel 19, the display screen 191 faces the user.

The battery box 2 has a top wall 21, a front edge 22; two opposite side edges 26, and a swinging arm 24. The top wall 21 comprises two upright locating rods 25 bilaterally disposed adjacent to the front edge 22 and adapted to engage into the two recessed locating holes 18 of the portable information display device 1, and a plug type electric connector 23 disposed adjacent to the front edge 22 of the battery box 2 and corresponding connectable to the socket type electric connector 17 of the portable information display device 1. The swinging arm 24 is a U-bar having two side rods 242 and a transverse rod 243 connected between the side rods 242. The side rods 242 have a respective bottom side 201 respectively pivoted to the two opposite side edges 26. The transverse rod 243 has a top side 202, and three top butts 241 respectively protruded from the top side 202 and terminating in a downwardly curved hooked portion 244 (see FIG. 4).

Referring to FIGS. 1 and 2 again, the battery box 2 is provided beneath the portable information display device 1 with the top wall 21 of the battery box 2 attached to the back wall 12 of the base member 11 of the portable information display device 1 in a collecting position. At this time, the three top butts 241 of the swinging arm 24 are respectively engaged into the three recessed mounting holes 15 in the back wall 12 of the base member 11 of the portable information display device 1 respectively, the plug type electric connector 23 is electrically connected to the socket type electric connector 17 to achieve an electric connection between the battery box 2 and the portable information display device 1, and the upright locating rods 25 are respectively engaged into the recessed locating holes 18 of the portable information display device 1.

Figure 3:
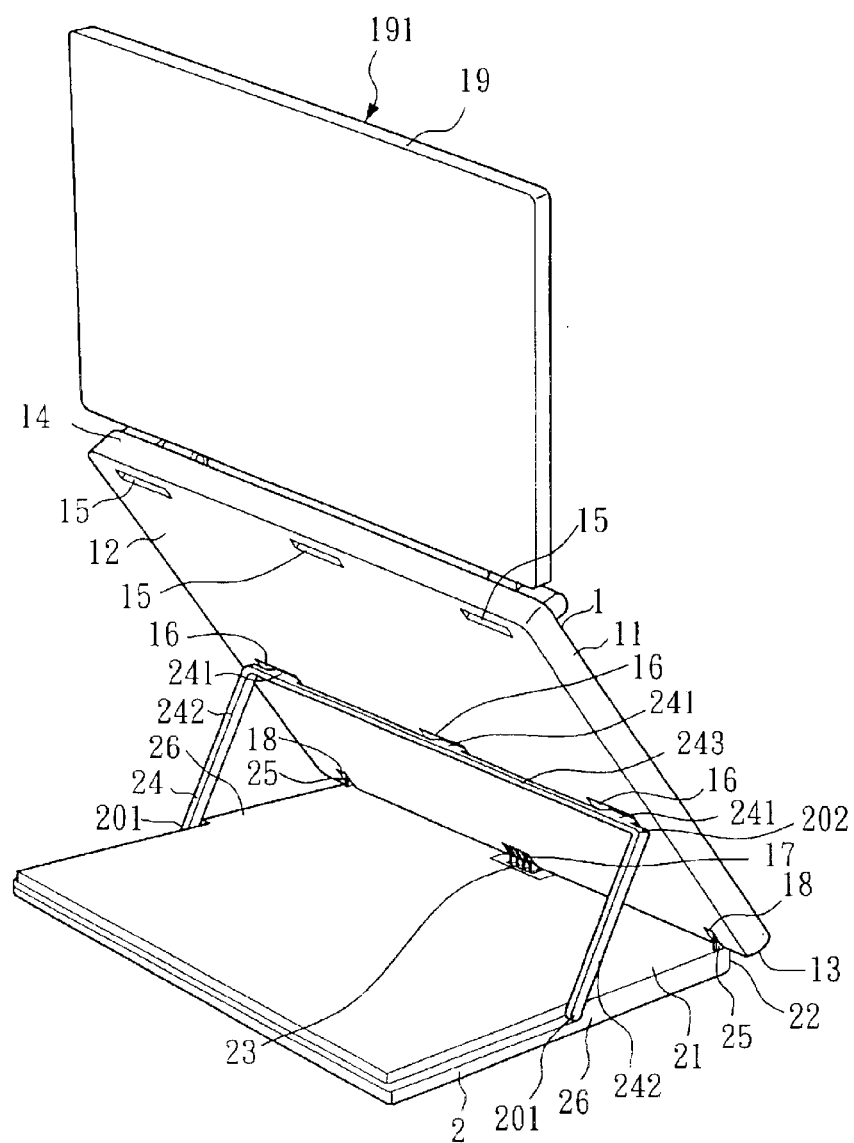
FIG. 3 is a perspective view showing one application example of the present invention.
Figure 4:
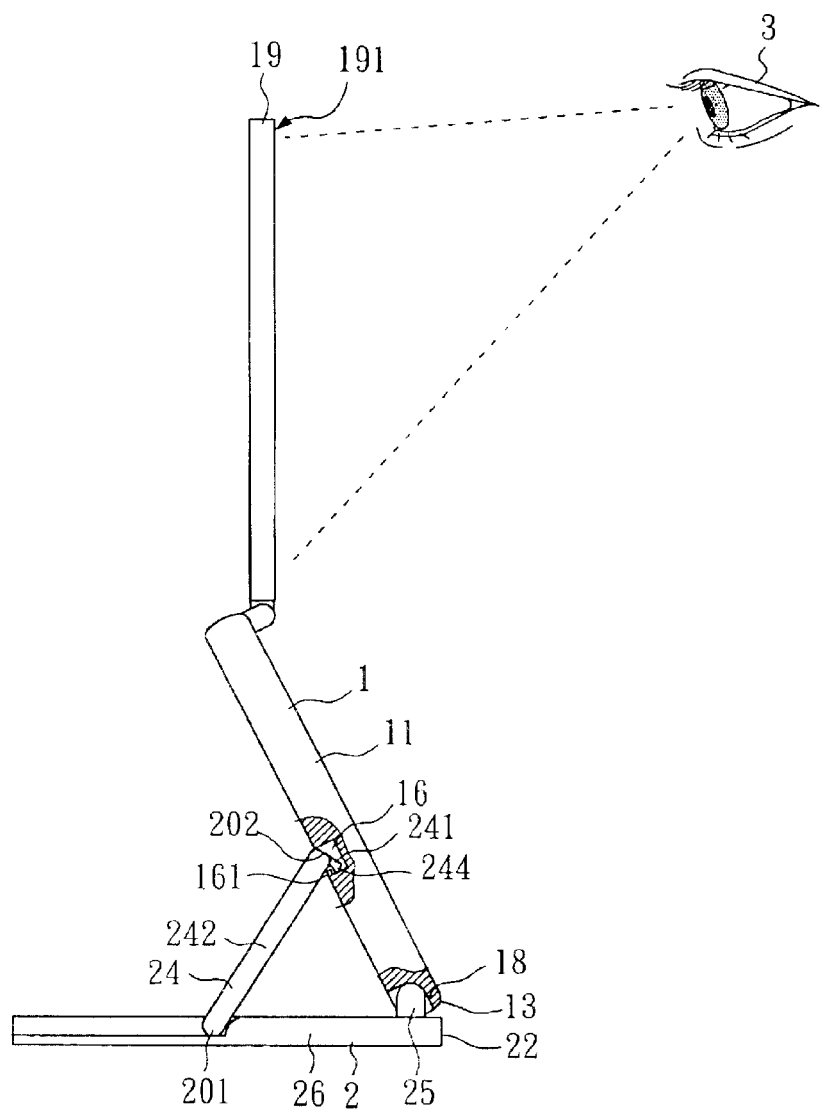
FIG. 4 is a side view of FIG. 3.

Referring to FIGS. 3 and 4, when adjusting the elevation of the portable information display device 1, lift and rotate the swinging arm 24 relative to the top wall 21 of the battery box 2, and then insert the three top butts 241 of the swinging arm 24 into the three recessed bearing holes 16 in the back wall 12 of the portable information display device 1 to force the downwardly curved hooked portions 244 of the top butts 241 into engagement with the three retaining rods 161 in the recessed bearing holes 16. Thus, the swinging arm 24 supports the portable information display device 1 on the battery box 2 in a tilted position, and the user can then open the display panel 19 from the base member 11. At this time, the recessed locating holes 18 are respectively coupled to the upright locating rods 25, and the plug type electric connector 23 is electrically connected to the socket type electric connector 17.

Therefore, by means of the aforesaid structural design, the portable information display device 1 can be supported on the battery box 2 in a tilted position by the swinging arm 24 with the display screen 191 facing the user's eyes 3 (see FIG. 4). This orthopedically engineered elevation adjustment structure comforts the user's eyes when the user is viewing the display screen 191.

The aforesaid portable information display device 1 is not limited to a DVD player. Alternatively, the portable information display device 1 can be PDA.

A prototype of elevation adjustment structure of a portable information display device has been constructed with the features of FIGS. 1–4. The elevation adjustment structure of a portable information display device functions smoothly to provide all of the features discussed earlier.

Although the present invention has been explained in relation to its preferred embodiment, it is to be understood that many other possible modifications and variations can be made without departing from the spirit and scope of the invention as hereinafter claimed.

What is claimed is:

1. An elevation adjustment structure of a portable information display device, comprising:

a portable information display device, said portable information display device comprising a base member, said base member comprising a back wall, a front edge, and a rear edge, said back wall comprising at least one recessed mounting hole disposed adjacent to the rear edge of said base member, two recessed locating holes bilaterally disposed adjacent to the front edge and extended to the front edge of said base member, a socket type electric connector disposed adjacent to the front edge of said base member, and at least one recessed bearing hole disposed on the middle position between the front edge and rear edge of said base member; and a battery box, said battery box comprising a top wall, a front edge, and a swinging arm, said top wall comprising two upright locating rods bilaterally disposed adjacent to the front edge of said battery box and adapted to engage into the two recessed locating holes of said base member of said portable information display device respectively, and a plug type electric connector disposed adjacent to the front edge of said battery box and corresponding connectable to said socket type electric connector of said portable information display device, said swinging arm comprising a bottom side pivoted to said battery box, a top side, and at least one top butt protruded from said top side;

wherein said battery box is provided beneath said portable information display device with the top wall of said battery box attached to the back wall of said base member in a collecting position to force the at least one top butt of said swinging arm into the at least one recessed mounting hole in the back wall of said base member respectively, keeping said plug type electric connector electrically connected to said socket type electric connector and said upright locating rods respectively engaged into said recessed locating holes of said portable information display device; said swinging arm is rotatable upwards relative to the top wall of said battery box for supporting said portable information display device on said battery box in a tilted position where the at least one top butt of said swinging arm is respectively engaged into the at least one recessed bearing hole in the back wall of said base member of said portable information display device, the two recessed locating holes of said base member of said portable information display device are respectively coupled to said two upright locating rods, and said plug type electric connector is electrically connected to said socket type electric connector.

2. The elevation adjustment structure of a portable information display device as claimed in claim 1, wherein said portable information display device further comprises a display panel hinged to said base member near the rear edge of said base member and rotatable relative to said base member between a close position and an open position, said display panel having a display screen, said display screen being exposed to the outside of said base member for viewing by the user when the user rotated said display panel to said open position.

3. The elevation adjustment structure of a portable information display device as claimed in claim 2, wherein said portable information display device is a video compact disk player.

4. The elevation adjustment structure of a portable information display device as claimed in claim 1, wherein said battery box further comprises two opposite side edges; said swinging arm comprises a transverse rod and two side rods respectively extended from two distal ends of said transverse rod, said two side rods comprising the bottom side of said swinging arm and respectively pivoted to the two opposite side edges of said battery box, said at least one top butt being protruded from said transverse rod.

5. The elevation adjustment structure of a portable information display device as claimed in claim 1, wherein the back wall of said base member further comprises at least one retaining rod respectively suspended in said at least one recessed bearing hole; said at least one top butt of said swinging arm each comprises a hooked portion for hooking on said at least one retaining rod in the at least one recessed bearing hole of said base member.

* * * * *